US012088591B2

(12) United States Patent
Vanguri et al.

(10) Patent No.: US 12,088,591 B2
(45) Date of Patent: *Sep. 10, 2024

(54) SYSTEM AND METHOD FOR IDENTITY VERIFICATION

(71) Applicant: VISA INTERNATIONAL SERVICE ASSOCIATION, San Francisco, CA (US)

(72) Inventors: Prasanna Vanguri, San Francisco, CA (US); Luba Goldberg, San Francisco, CA (US); Jeffrey Moore, San Francisco, CA (US); Alex Godshall, San Francisco, CA (US); Neil Mumm, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 168 days.

This patent is subject to a terminal disclaimer.

(21) Appl. No.: 17/748,820

(22) Filed: May 19, 2022

(65) Prior Publication Data

US 2022/0278986 A1    Sep. 1, 2022

Related U.S. Application Data

(63) Continuation of application No. 16/409,648, filed on May 10, 2019, now Pat. No. 11,368,460.

(51) Int. Cl.
*H04L 9/40* (2022.01)
*H04L 67/01* (2022.01)

(52) U.S. Cl.
CPC ............. *H04L 63/10* (2013.01); *H04L 67/01* (2022.05)

(58) Field of Classification Search
CPC .................. H04L 63/10; H04L 67/01
See application file for complete search history.

(56) References Cited

U.S. PATENT DOCUMENTS

| | | | |
|---|---|---|---|
| 2009/0089866 A1* | 4/2009 | Yato | G06F 21/6218 726/2 |
| 2012/0216300 A1* | 8/2012 | Vivolo | G06F 21/10 726/30 |
| 2016/0088471 A1* | 3/2016 | Feng | H04L 9/3226 705/73 |
| 2016/0294879 A1* | 10/2016 | Kirsch | H04L 63/0823 |
| 2017/0286929 A1* | 10/2017 | Bodman | G06F 16/22 |
| 2018/0254907 A1* | 9/2018 | Gasparini | H04L 9/3255 |
| 2018/0322489 A1* | 11/2018 | Altenhofen | H04L 9/3297 |
| 2019/0026737 A1* | 1/2019 | McLaughlin | G06Q 20/40 |
| 2019/0051298 A1* | 2/2019 | Lee | H04M 1/72403 |
| 2019/0149524 A1* | 5/2019 | Bankston | H04L 63/0421 726/26 |
| 2020/0327539 A1* | 10/2020 | Andrew | G06Q 20/023 |

* cited by examiner

*Primary Examiner* — Dhairya A Patel
*Assistant Examiner* — Eui H Kim
(74) *Attorney, Agent, or Firm* — Kilpatrick Townsend & Stockton LLP

(57) ABSTRACT

Systems and method for verifying an identity of a user during interaction with a resource provider are disclosed. Embodiments enable using an authorization request message to inquire about an identity attribute (e.g. age) of a user during an interaction between the user and a resource provider. An authorizing entity (e.g. issuer) or a processing entity provides an answer to the inquiry within an authorization response message. The answer to the inquiry may establish whether the consumer meets a threshold (e.g. minimum age requirement).

15 Claims, 8 Drawing Sheets

SYSTEM AND METHOD FOR IDENTITY VERIFICATION

RELATED APPLICATIONS

This application is a continuation application of U.S. application Ser. No. 16/409,648, filed May 10, 2019, the content of which is hereby incorporated by reference in its entirety.

BACKGROUND

Interactions between users and resource providers may be associated with access requests to restricted goods, services or locations. For example, during an interaction with a liquor store merchant, a user may wish to purchase an alcoholic beverage. Since the interaction (e.g. the purchase request) has a predetermined age limit (e.g. user must be at least 21 years old), the merchant is required to check the identification of the user. This requires the user to present a form of identification, which may not be readily available or may inconvenience the user. Moreover, in some cases, the resource providers may be presented with false identification that may go undetected. In other cases, a clerk of the resource provider may inadvertently omit the identification check. There are also a growing number of use cases where no clerk is present to check ID (e.g. eCommerce, mobile commerce, vending machines). Thus, the interaction may proceed even though the user may not meet the requirements needed to obtain the resource (e.g. the user may not be above the predetermined age limit).

Embodiments of the invention address these and other problems individually and collectively.

SUMMARY

Embodiments of the invention include more effective and efficient ways to verify an identity attribute of a user. Embodiments enable using an authorization request message to inquire about an identity attribute (e.g. age) of a user during an interaction between the user and a resource provider. An authorizing entity (e.g. issuer) or a processing entity provides an answer to the inquiry within an authorization response message. The answer to the inquiry may establish whether the consumer meets a threshold (e.g. minimum age requirement).

One embodiment of the invention includes a method. The method includes receiving, by a server computer from an access device, an authorization request message for an interaction between a user and a resource provider. The authorization request message includes an access credential and one or more assertion type indicators. The method also includes transmitting, by the server computer, an authorization response message comprising an indicator approving or declining the interaction, and one or more assertion values associated with the one or more assertion type indicators to the access device. At least one of the one or more assertion type indicators may indicate if the user is above a predetermined age.

In some embodiments, the method may also include parsing, by the server computer, the authorization request message, and identifying the one or more assertion type indicators embedded in the authorization request message based on parsing. The method may further include searching, by the server computer, a database storing assertion values for assertion type indicators, and access credentials. The server computer may retrieve the one or more assertion values corresponding to the one or more assertion type indicators for the user from the database, and generate the authorization response message.

In some embodiments, the server computer performing the method may be a processing computer. The method may also include transmitting, by the server computer, the authorization request message to an authorizing computer, which causes the authorizing computer to parse the authorization request message, identify the one or more assertion type indicators embedded in the authorization request message based on parsing, search a database storing assertion values for assertion type indicators, and access credentials, and retrieve the one or more assertion values corresponding to the one or more assertion type indicators for the user from the database, and generate the authorization response message. The method may also include receiving, by the server computer, the authorization response message from the authorizing computer.

Another embodiment of the invention is directed to a computer programmed to perform the above-noted method.

Another embodiment of the invention is directed to a method including transmitting, by an access device to a server computer, an authorization request message for an interaction between a user and a resource provider, the authorization request message comprising an access credential and one or more assertion type indicators. The method also includes receiving, by the access device from the server computer, an authorization response message comprising an indicator approving or declining the interaction, and one or more assertion values associated with the one or more assertion type indicators.

Further details regarding embodiments of the invention can be found in the Detailed Description and the Figures.

DETAILED DESCRIPTION

Figure 1:
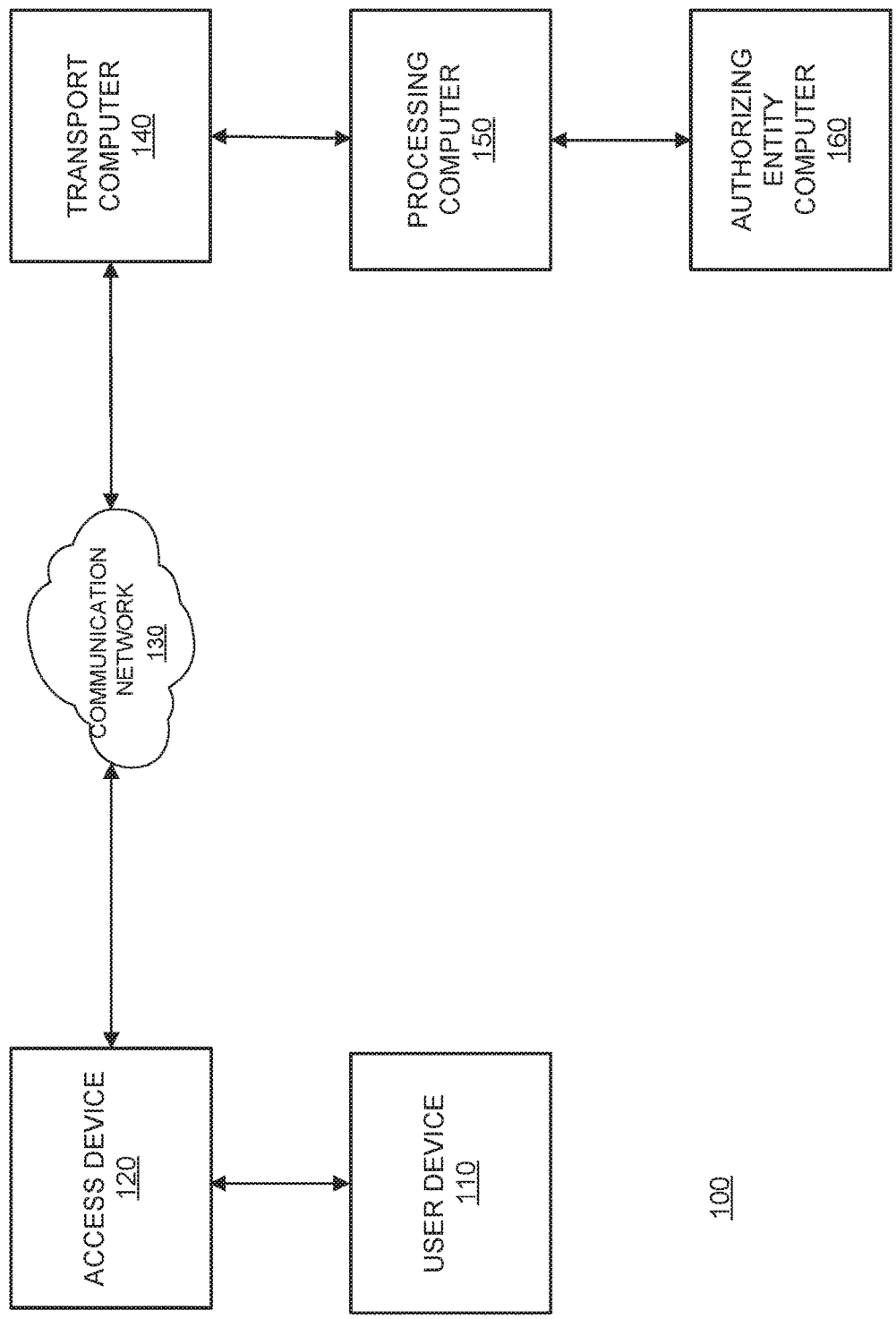
FIG. 1 shows a system diagram according to various embodiments.

Prior to discussing embodiments of the invention, some terms can be described in further detail.

An "identity attribute" may refer to a particular piece of information about an entity (e.g., person, organization, thing, or the like). Examples of identity attributes include a social security number, an age, a phone number, a bank account number, and an affiliation associated with a person.

An "assertion" may refer to a secure fact about an entity. An assertion can protect information while being useful to achieve a particular goal. For example, an assertion may specify something about an entity, such as whether the entity should be allowed to purchase alcohol in a particular location. The assertion may be "Jane Doe is old enough to purchase alcohol in California." This assertion can be used by a bar in its decision to serve alcohol to a person, instead of conveying the person's driver's license information to the bar. As another example, an assertion may specify whether an entity has an account which can accept deposits (e.g., "Jane Doe has a bank account and can accept deposits.").

An "assertion type indicator" may be a category of assertions, e.g., whether an entity is at least 21 years old. The "assertion value" associated with the assertion type indicator may be a corresponding answer for a particular entity, which may in the form of "yes" or "no," or may be an affirmative statement (e.g., "Jane Doe is at least 21 years old."). The assertion value may be a numerical value or a symbol associated with a predetermined meaning (e.g. 1=yes, 0=no). An assertion type indicator and/or the assertion value may be secured cryptographically. An assertion type indicator and/or the assertion value may be digitally signed by the entity of interest and/or the trusted party providing the secure facts.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "interaction" may include a reciprocal action or influence that involves more than one actor. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate payment for a good or a service.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, and the like. In some embodiments, an access device can be a device that acts as a payment terminal on an airplane or other vehicle. On an airplane, payment terminals may be in front of passengers on the seatbacks in front of them. Or, they may be handheld terminals used by flight attendants to process purchases made by passengers. In some embodiments, where an access device may comprise a POS terminal, any suitable POS terminal may be used and may include a reader, a processor, and a computer-readable medium.

An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

An "access request" may include a request for access to a resource. The resource may be a physical resource (e.g., good), a digital resource (e.g., electronic document, electronic data, etc.), or a service. In some cases, an access request may be submitted by transmission of an access request message that includes access request data. Typically a device associated with a requestor may transmit the access request message to a device associated with a resource provider.

"Access credential" may include any suitable data that can be used to access a resource or create data that can access a resource. A credential may be a string of numbers, letters, or any other suitable characters, as well as any object or document that can serve as confirmation. In some embodiments, access data may be account information for a payment account. Account information may include a PAN (primary account number), payment token, expiration date, card verification values (e.g., CVV, CVV2), dynamic card verification values (dCVV, dCVV2), PII (personal identifiable information) such as name, address, phone number, etc. In other embodiments, access data could include data that can be used to access a location or to access secure data. Such information may be ticket information for an event, data to access a building, transit ticket information, passwords, biometrics or other credentials to access secure data, etc.

An "authorizing entity" may be an entity that authorizes a request, typically using an authorization computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "user" may include an individual or a computational device. In some embodiments, a user may be associated with one or more personal accounts and/or mobile devices. In some embodiments, the user may be a cardholder, account holder, or consumer.

An "authorization request message" may be an electronic message that is sent to a processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing computer) to the merchant's access device (e.g., POS equipment) that indicates approval of the transaction. The code may serve as proof of authorization. In some embodiments, a processing computer may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Resource providers, such as merchants, may have to verify personal information about a consumer prior to rendering services or selling certain type of goods to the consumer. Resource providers may also need to verify personal information about a user prior to granting access to secure locations (e.g. virtual locations such as databases, websites, as well as physical locations such as buildings). For example, a merchant may have to verify the age of a consumer before selling an age-restricted product (e.g. tobacco, alcohol) or before providing an age-restricted service (e.g. rent a car, access an online gambling site). Similarly, other information about the consumer may be required to fulfill a transaction. Such information may include a membership status, veteran status, whether or not the consumer has outstanding debt, whether or not the consumer is creditworthy, etc.

During an interaction between a consumer (e.g. a user) and a resource provider, embodiments enable the resource provider to incorporate an assertion type indicator (e.g. a question about an identity attribute of the consumer) in an authorization request message associated with the interaction. The authorization request message may be sent to an authorizing entity and/or a processing entity that is in a position to provide an assertion value (e.g. an answer to the question about the identity attribute of the consumer) associated with the assertion type indicator. According to various embodiments, the assertion type indicator may be incorporated automatically in the authorization request message without requiring an action on the part of a resource provider clerk. For example, the access device of a vending machine may automatically incorporate the assertion type indicator in the authorization request message. According to various embodiments, the authorization request message may include a data field dedicated for the assertion type indicator.

In some embodiments, identity attributes of a user may be stored at a secure database that meets security requirements for storing trusted data, and that is accessible by the authorizing entity and/or the processing entity. Upon receiving the assertion type indicator, the authorizing entity or the processing entity may access the database to determine an assertion value (e.g. an answer) for the assertion type indicator. In some embodiments, the database may store the assertion type indicator and the corresponding assertion value as a database entry pair.

The assertion type indicator may be in form of a closed question that can be answered either in the affirmative or negative. The assertion value may be in the affirmative or negative (e.g. YES, NO), or may be in form of a predetermined code for the affirmative or negative (e.g. 1=affirmative, 0=negative). The codes may be previously shared with the resource provides so that the resource provider may determine the meaning of the code upon receipt of the assertion value. The assertion type indicator may be associated with any kind of request that can be answered by the authorization computer using data that is readily stored by, or otherwise accessible by, the authorizing entity and/or the processing entity (e.g. know your customer (KYC) data).

An authorizing entity and/or a processing entity receiving the authorization request message and the assertion type indicator (together or individually), may determine the assertion value associated with the assertion type indicator. In some embodiments, the authorizing entity and/or the processing entity may decline authorizing the interaction solely based on determining that the consumer does not meet a threshold requirement. For example, the assertion value may indicate that the consumer is not 18 years old for a tobacco sale interaction. In this case, the authorization response message may include an indicator declining the interaction along with assertion value indicating that the consumer is not 18 years old. The authorizing entity and/or the processing entity may return the assertion value in an authorization response message to the resource provider. According to various embodiments, the authorization response message may include a data field dedicated for the assertion value.

FIG. 1 shows a block diagram of a system 100 comprising a number of components according to some embodiments. The system 100 comprises a user device 110, an access device 120, a communication network 130, a transport computer 140, a processing computer 150, and an authorizing entity computer 160. The components of the system 100 may be in operative communication with each other.

Message between the entities, computers, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The user device 110 may include any suitable user device operated by a user. For example, the user device 110 may include a payment card (e.g. a credit card, a prepaid card, a debit card).

During an interaction with a resource provider, the user may present the user device 110 to the access device 120 (e.g., POS equipment) of the resource provider. The interaction may be, for example, a request to purchase goods, purchase services, gain access to a physical secure location (e.g. a building, a vault), or gain access to a virtual secure location (e.g. a database, a website). The access device 120 may retrieve an access credential from the user device 110. In some embodiments, the access credential may be used to access the secure location (e.g. the physical secure location or the virtual secure location). In other embodiments, the access credential may include payment credentials associated with a payment account of the user issued by the authorizing entity.

The access device 120 may generate an authorization request message requesting authorization for the interaction between the user and the resource provider. The authorization request message may include the access credential. According to various embodiments, the authorization request message may also include an assertion type indicator (e.g. an inquiry about an identity attribute of the user). The access device 120 may be configured to generate the authorization request message, and embed the access credential and the assertion type indicator in the authorization request message. In some embodiments, if the resource provider is a merchant, the authorization request message may comprise a transaction amount. The access device 120 may send the authorization request message to the transport computer 140 via the communication network 130.

The transport computer 140 may be located between (in an operational sense) the access device 120 and the processing computer 150. The transport computer 140 may be operated by an entity such as an acquirer. An acquirer can maintain an account of any resource providers (e.g. merchants) with which users may wish to interact. Upon receiving the authorization request message, the transport computer 140 may transmit the authorization request message to the processing computer 150.

As shown in FIG. 1, the processing computer 150 may be disposed between the transport computer 140 and the authorizing entity computer 160. The processing computer 150 may include data processing subsystems, networks, and operations used to support and deliver authorization services, exception file services, and clearing and settlement services. For example, the processing computer 150 may comprise a server coupled to a network interface (e.g., by an external communication interface), and databases of information. The processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing computer 150 may use any suitable wired or wireless network, including the Internet. In some embodiments, the processing computer 150 may forward the authorization request message received from the transport computer 140 to the authorizing entity computer 160 via a communication channel. The transaction processing computer 150 may further forward an authorization response message received from the authorizing entity computer 160 to the transport computer 140.

The authorizing entity computer 160 may be configured to authorize any suitable request, including access to data, access to a location, or approval for a payment. In some embodiments, the authorizing entity computer 160 may be operated by an account issuer. Typically, the issuer is an entity (e.g., a bank) that issues and maintains an account of a user. The account may be a credit, debit, prepaid, or any other type of account. The authorizing entity computer 160 may issue and manage an account of the user 110. The account can be tied to the access credential. The authorizing entity computer 160 may authorize transactions that involve the payment account. Before authorizing a transaction, the authorizing entity computer 160 may authenticate and process credentials received in an authorization request message and check to see if there is available credit or funds in an account associated with the access credentials. The authorizing entity computer 160 may also receive and/or determine a risk level associated with the transaction, and may weigh the risk when deciding whether or not to authorize the transaction. If the authorizing entity computer 160 receives an authorization request that includes a payment token, the authorizing entity computer 160 may be able to de-tokenize the payment token in order to obtain the associated payment credentials.

The processing computer 150 or the authorizing entity computer 160 may access a secure database to identify an assertion value (e.g. an answer to the inquiry about an identity attribute of the user) associated with the assertion type indicator embedded in the authorization request message. The processing computer 150 or the authorizing entity computer 160 may incorporate the assertion value in the authorization response message before transmitting the authorization response message to the access device 120 via the transport computer 140. In some embodiments, the access device 120 may display whether the interaction has been authorized or declined, as well as information derived from the assertion value (e.g. a message or visual indicator indicating whether a predetermined threshold, such as a predetermined age, is met).

Figure 2:
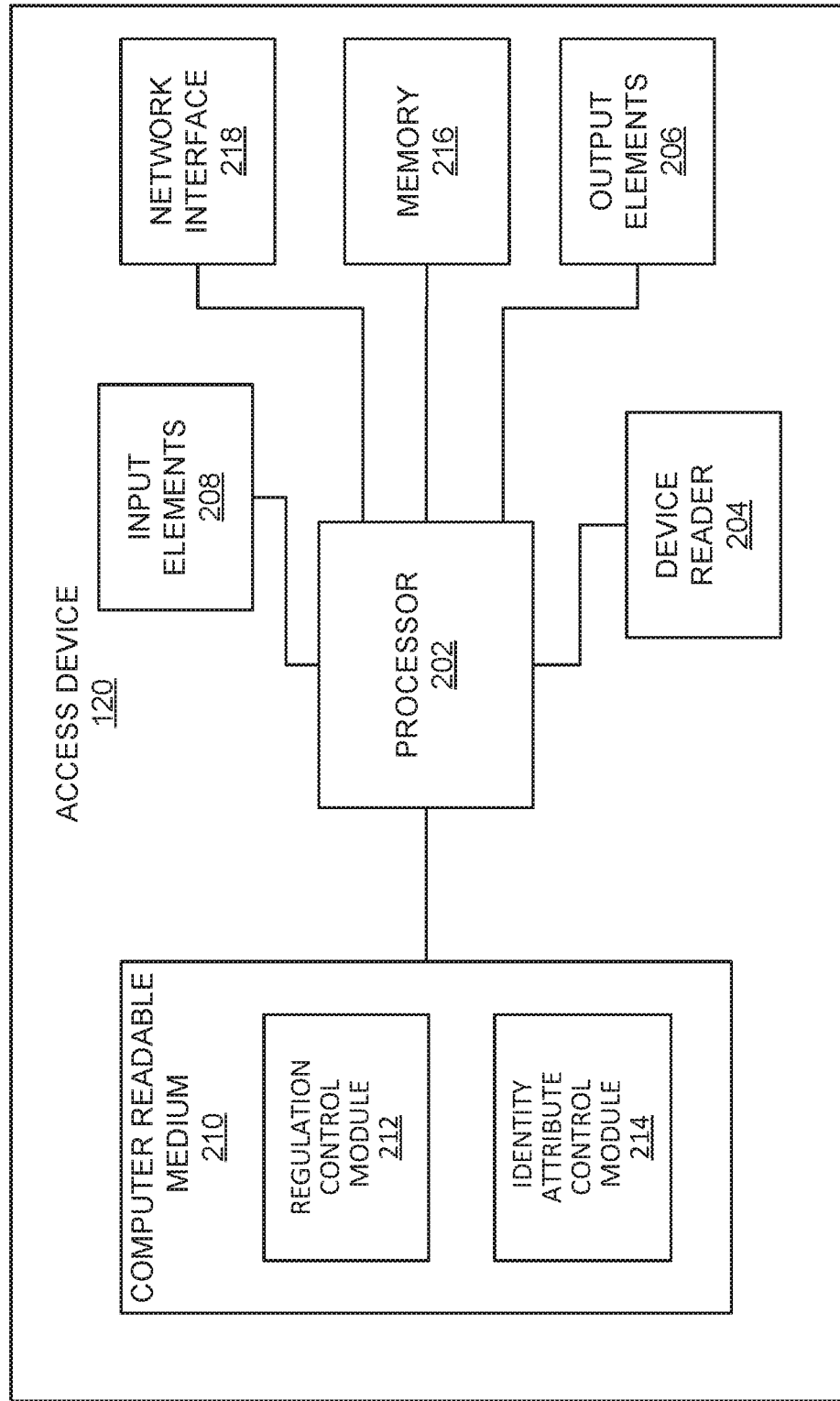
FIG. 2 illustrates a diagram of an exemplary access device according to various embodiments.

FIG. 2 shows a block diagram of the access device 120 according to some embodiments of the invention. The exemplary access device 120 may comprise a processor 202. The processor 202 may be coupled to a device reader 204, one or more output elements 206, one or more input elements 208, a non-transitory computer readable medium 210 comprising a regulation control module 212 and an identity attribute control module 214, a memory 216, and a network interface 218.

The device reader 204 may comprise any suitable device capable of reading data from a user device 110 such as an access card (e.g., a payment card). The device reader 204 include antennas, electrical contacts, etc., and can read data on memory chips or magnetic stripes on portable device such as cards.

The one or more output elements 206 may comprise any suitable device(s) that may output data. Examples of output elements 206 may include display screens, speakers, and data transmission devices.

The one or more input elements 208 may include any suitable device(s) capable of inputting data into the access device 208. Examples of input devices include buttons, touchscreens, touch pads, microphones, etc.

The computer readable medium 210 may comprise code, executable by the processor 202, to implement a method comprising: transmitting, by the access device to a server computer, an authorization request message for an interaction between a user and a resource provider, the authorization request message comprising an access credential and one or more assertion type indicators; and receiving, by the access device from the server computer, an authorization response message comprising an indicator approving or declining the interaction, and one or more assertion values associated with the one or more assertion type indicators to the access device.

The regulation control module 212 of the computer readable medium 210 may determine, in conjunction with the processor 202, whether the authorization request is for a regulated good or service. For example, the regulation control module 212 and the processor 202 may determine that the good (e.g. tobacco, alcohol), or the service (e.g. access to an adult website, car rental request, access to a building) can only be provided to persons over a predetermined age. Upon determining the regulation, the regulation control module 212 and the processor 202 may send a trigger to the identity attribute control module 214 of the computer readable module 208. The identity attribute control module 214, in conjunction with the processor 202, may embed the one or more assertion type indicators in a data field of the authorization request message. In some embodiments, the assertion type indicator may indicate if the user is above a predetermined age (e.g. "Is consumer X at least 21 years old?"). The identity attribute control module 214, in conjunction with the processor 202, may embed the one or more assertion type indicators in the authorization request message.

According to various embodiments, the data field of the authorization request message that stores the assertion type indicator may be customized based on the resource provider or the good/service provided by the resource provider. For example, the assertion type indicator may for tobacco products may be based on the predetermined age limit of 18, and may be automatically inserted in the authorization request message when the purchase includes a tobacco product. On the other hand, the assertion type indicator may for alcoholic beverages may be based on the predetermined age limit of 21, and may be automatically inserted in the authorization request message when the purchase includes an alcoholic beverage. The access device 120 may automatically insert the assertion type indicator in the authorization request message based on an identifier of the good/service (e.g. upon scanning an SKU (stock keeping unit) or barcode attached to the good). In some embodiments, the access device 120 may insert the assertion type indicator in the authorization request message for each interaction as needed (e.g. on a case by case basis).

As provided above, the authorization response message received at the access device 120 includes the indicator approving or declining the interaction, and one or more assertion values associated with the one or more assertion type indicators to the access device. In some embodiments, the indicator approving or declining the interaction indicates that the interaction is declined. The decline may be based at least upon a determination that the one or more assertion values represent failure to meet a predetermined threshold. For example, if the assertion type indicator indicated if the user is above a predetermined age (e.g. "Is consumer X at least 21 years old?"), the assertion value corresponding to the assertion type indicator may indicate that the user is not above the predetermined age (e.g. "NO"). In other embodiments, the indicator approving or declining the transaction may be independent of that one or more assertion values in the authorization response message. For example, the authorization request message may indicate that the interaction is approved. However, the assertion value in the authorization request message may indicate that the user is under 21 years of age. It will then be up to the resource provider to decide whether or not to release the requested resource to the user. According to various embodiments, the assertion value does not include the identity attribute (e.g. the actual age or birthday) of the user. In some embodiments, the assertion value may be a numerical value (e.g. 1, 0) that the access device 120 may translate into an affirmative or negative answer (e.g. 1=Yes; 0=No).

Upon receiving the authorization response message, the access device 120 may display the indicator approving or declining the interaction and the one or more assertion values corresponding to the one or more assertion type indicators for the user on one of the output elements 206 (e.g. a display screen). For example, the access device 120 may display a notice indicating that the interaction is declined because the age requirement is not met. In some embodiments, the access device may emit a visual or audio signal based on the assertion value. For example, if the assertion value indicates that the user meets the predetermined requirement, the access device 120 may display a green light. If the assertion value indicates that the user fails to meet the predetermined requirement, the access device 120 may display a red light. As provided above, the assertion values received at the access device 120 may not indicate the actual identity data of the consumer (e.g. the assertion value does not contain the age or birthday of the consumer). The assertion value may simply be a YES/NO answer to each one of the assertion type indicators included in the authorization request message.

The memory 216 can be used to store data and code. The memory 216 may be coupled to the processor 202 internally or externally (e.g., cloud based data storage), and may comprise any combination of volatile and/or non-volatile memory, such as RAM, DRAM, ROM, flash, or any other suitable memory device. The memory 216 may store encrypted access data, key identifiers, public keys, and any other relevant data securely. The memory 216 may be in the form of a secure element, a hardware security module, or any other suitable form of secure data storage.

The network interface 218 may include an interface that can allow the access device 120 to communicate with external computers. Network interface 218 may enable the access device 120 to communicate data to and from another device (e.g., transport computer, authorizing entity computer, etc.). Some examples of network interface 218 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by network interface 218 may include Wi-Fi™. Data transferred via network interface 218 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 218 and other devices via a communications path or channel. Any suitable communication path or channel may be used such as, for instance, a wire or cable, fiber optics, a telephone line, a cellular link, a radio frequency (RF) link, a WAN or LAN network, the Internet, or any other suitable medium. The network interface 218 can utilize a long range communication channel as well as a short range communication channel.

Figure 3:
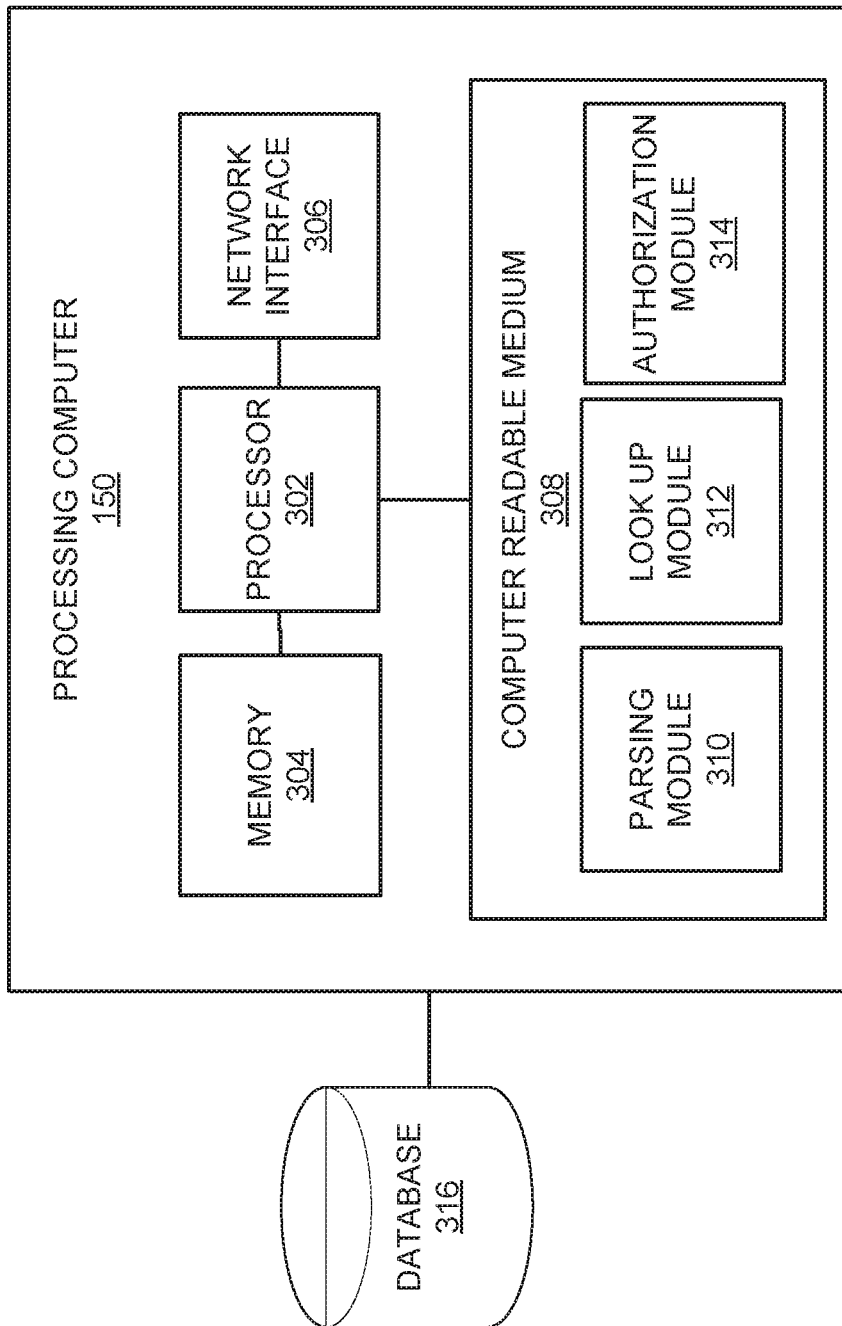
FIG. 3 illustrates a diagram of an exemplary processing computer according to various embodiments.

FIG. 3 shows a block diagram of the processing computer 150 according to some embodiments of the invention. The processing computer 150 may comprise a processor 302. The processor 302 may be coupled to a memory 304, a network interface 306, and a non-transitory computer readable medium 308 comprising, in some embodiments, a parsing module 310, a look-up module 312, an authorization module 314. The processing computer 150 may access a database 316. A clearing and settlement module (not shown) may also be present on the computer readable medium. In some embodiments, the database 316 may be an integral part of the processing computer 150.

The computer readable medium 308 may comprise code, executable by the processor 302, to implement a method comprising: receiving, from an access device, an authorization request message for an interaction between a user and a resource provider, the authorization request message comprising an access credential and one or more assertion type indicators; and transmitting an authorization response message comprising an indicator approving or declining the interaction, and one or more assertion values associated with the one or more assertion type indicators to the access device.

The processing computer 150 may transmit the authorization request message to the authorizing computer 160, which causes the authorizing computer 160 to parse the authorization request message, identify the one or more assertion type indicators embedded in the authorization request message based on parsing, search a database storing assertion values for assertion type indicators, and access credentials, retrieve the one or more assertion values corresponding to the one or more assertion type indicators for the user from the database, and generate the authorization response message. The processing computer 150 may receive the authorization response message from the authorizing computer 160 and transmit the authorization response message to the access device 120 via the transport computer 140.

In some embodiments, the processing computer 150 may be configured to determine the assertion value for the one or more assertion type indicators embedded in the authorization request message. The parsing module 310 of the computer readable medium 308 may parse the authorization request message and identify the one or more assertion type indicators embedded in the authorization request message based on parsing. According to various embodiments, the database 316 may store assertion values for assertion type indicators, and access credentials. In some embodiments, the database 316 may store an assertion type indicator and an associated assertion value as a data pair. The database 316 may also store identity attributes associated with a user such that an assertion value for a given assertion type indicator may be determined by identifying the relevant identity attributes of the user. For example, the database may store the assertion type indicator ("Is consumer X at least 21 years old?") along with the corresponding assertion value (e.g. "YES" or "NO") as a database entry pair. In some embodiments, the database may store the birthday or the age of the user, and may determine the assertion value (e.g. "YES" or "NO") for the received assertion type indicator ("Is consumer X at least 21 years old?").

The lookup module 312 of the computer readable medium 308, in conjunction with the processor 302, may search the database 316 storing assertion values for assertion type indicators, and access credentials. The lookup module 312, in conjunction with the processor 302, may retrieve the one or more assertion values corresponding to the one or more assertion type indicators for the user from the database 316. The processing computer 150 may embed the one or more assertion values corresponding to the one or more assertion type indicators in the authorization request message forwarded to the authorizing entity computer 160 or may embed the one or more assertion values corresponding to the one or more assertion type indicators in the authorization response message forwarded to the access device 120.

In some embodiments, the processing computer 150 may perform stand-in processing for the authorizing entity and may determine whether the interaction is to be authorized or declined. The authorization module 314 of the processing computer 150 may generate the authorization response message including the indicator approving or declining the interaction, and one or more assertion values associated with the one or more assertion type indicators to the access device.

In some embodiments, the indicator approving or declining the interaction indicates that the interaction is declined based at least upon a determination that the one or more assertion values represent failure to meet a predetermined threshold. For example, if the assertion type indicator indicated if the user is above a predetermined age (e.g. "Is consumer X at least 21 years old?"), the assertion value corresponding to the assertion type indicator may indicate that the user is not above the predetermined age (e.g. "NO"). According to various embodiments, the assertion value may not include the identity attribute (e.g. the actual age or birthday) of the user. In some embodiments, the assertion value may be a numerical value (e.g. 1, 0) that the access device 120 may translate into an affirmative or negative answer (e.g. 1=Yes; 0=No).

The memory 304 can be used to store data and code. The memory 304 may be coupled to the processor 302 internally or externally (e.g., cloud based data storage), and may comprise any combination of volatile and/or non-volatile memory, such as RAM, DRAM, ROM, flash, or any other suitable memory device.

The network interface 306 may include an interface that can allow the processing computer 150 to communicate with external computers. Network interface 306 may enable the processing computer 150 to communicate data to and from another device (e.g., transport computer, authorizing entity computer, etc.). The network interface 306 may have the same or different characteristics as the network interface 218 in the access device shown in FIG. 2.

Figure 4:
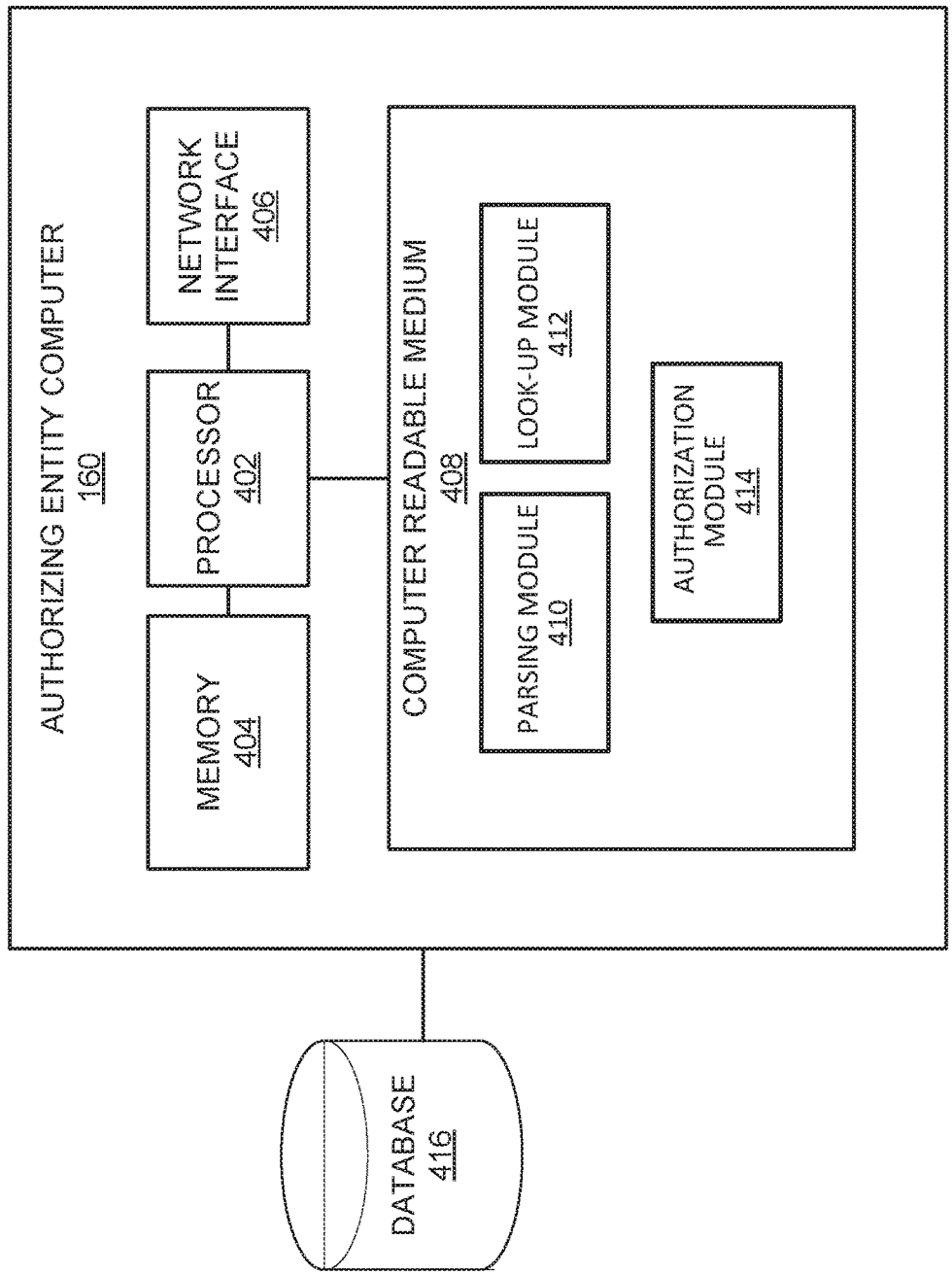
FIG. 4 illustrates a diagram of an exemplary authorizing entity computer according to various embodiments.

FIG. 4 shows a block diagram of the authorizing entity computer 160 according to some embodiments of the invention. The authorizing entity computer 160 may comprise a processor 402. The processor 402 may be coupled to a memory 404, a network interface 406, and a non-transitory computer readable medium 408 comprising one or more of a parsing module 410, a look-up module 412, an authorization module 414. The authorizing entity computer 160 may access a database 416. In some embodiments, the database 416 may be an integral part of the authorizing entity computer 160.

The computer readable medium 408 may comprise code, executable by the processor 402, to implement a method comprising: receiving, from an access device, an authorization request message for an interaction between a user and a resource provider, the authorization request message comprising an access credential and one or more assertion type indicators; and transmitting an authorization response message comprising an indicator approving or declining the interaction, and one or more assertion values associated with the one or more assertion type indicators to the access device.

The method implemented by the authorizing entity computer 160 may also include parsing the authorization request message, identifying the one or more assertion type indicators embedded in the authorization request message based on parsing, searching the database storing assertion values for assertion type indicators, and access credentials, retrieving the one or more assertion values corresponding to the one or more assertion type indicators for the user from the database, and generating the authorization response message. The authorizing entity computer 160 may transmit the authorization response message to the processing computer 150, which may then transmit the authorization response message to the access device 120 via the transport computer 140.

In some embodiments, the authorizing entity computer 160 may be configured to determine the assertion value for the one or more assertion type indicators embedded in the authorization request message. The parsing module 410 of the computer readable medium 408, in conjunction with the processor 402, may parse the authorization request message and identify the one or more assertion type indicators embedded in the authorization request message based on parsing. According to various embodiments, the database 416 may store assertion values for assertion type indicators, and access credentials. In some embodiments, the database 416 may store an assertion type indicator and an associated assertion value as a data pair. The database 416 may also store identity attributes associated with a user such that an assertion value for a given assertion type indicator may be determined by identifying the relevant identity attributes of the user. For example, the database may store the assertion type indicator ("Is consumer X at least 21 years old?") along with the corresponding assertion value (e.g. "YES" or "NO") as a database entry pair. In some embodiments, the database may store the birthday or the age of the user, and may determine the assertion value (e.g. "YES" or "NO") for the received assertion type indicator ("Is consumer X at least 21 years old?").

The lookup module 412 of the computer readable medium 408, in conjunction with the processor 402, may search the database 416 storing assertion values for assertion type indicators, and access credentials. The lookup module 412 may, in conjunction with the processor 402, retrieve the one or more assertion values corresponding to the one or more assertion type indicators for the user from the database 416. The authorizing entity computer 160 may embed the one or more assertion values corresponding to the one or more assertion type indicators in the authorization response message transmitted to the processing computer 150.

In some embodiments, the authorizing entity computer 160 may not process the assertion type indicators in the authorization request message. The authorizing entity computer 160 may or may not identify the assertion type indicators. In either case, the authorizing entity computer 160 may allow the processing computer 150 to identify the assertion values corresponding to the assertion type indicators. The authorizing entity computer 160 may process the authorization request message to authorize or decline the interaction, and generate an authorization response message including the indicator approving or declining the interaction. The authorization response message may still include the assertion type indicators that the authorizing entity computer 160 received in the authorization request message. The authorizing entity computer 160 may transmit the authorization response message including the indicator approving or declining the interaction, and the assertion type indicators to the processing computer 150. The processing computer 150 may identify the assertion values corresponding to the assertion type indicators as described above in connection with FIG. 3. The processing computer 150 may then modify the authorization response message to include the indicator approving or declining the interaction as well as the assertion values corresponding to the assertion type indicators. The processing computer 150 may transmit the modified authorization response message to the access device 120 via the transport computer 140.

The memory 404 can be used to store data and code. The memory 404 may be coupled to the processor 402 internally or externally (e.g., cloud based data storage), and may comprise any combination of volatile and/or non-volatile memory, such as RAM, DRAM, ROM, flash, or any other suitable memory device.

The network interface 406 may include an interface that can allow the authorizing entity computer 160 to communicate with external computers. The network interface 306 may have the same or different characteristics as the network interface 218 in the access device shown in FIG. 2.

Figure 5:
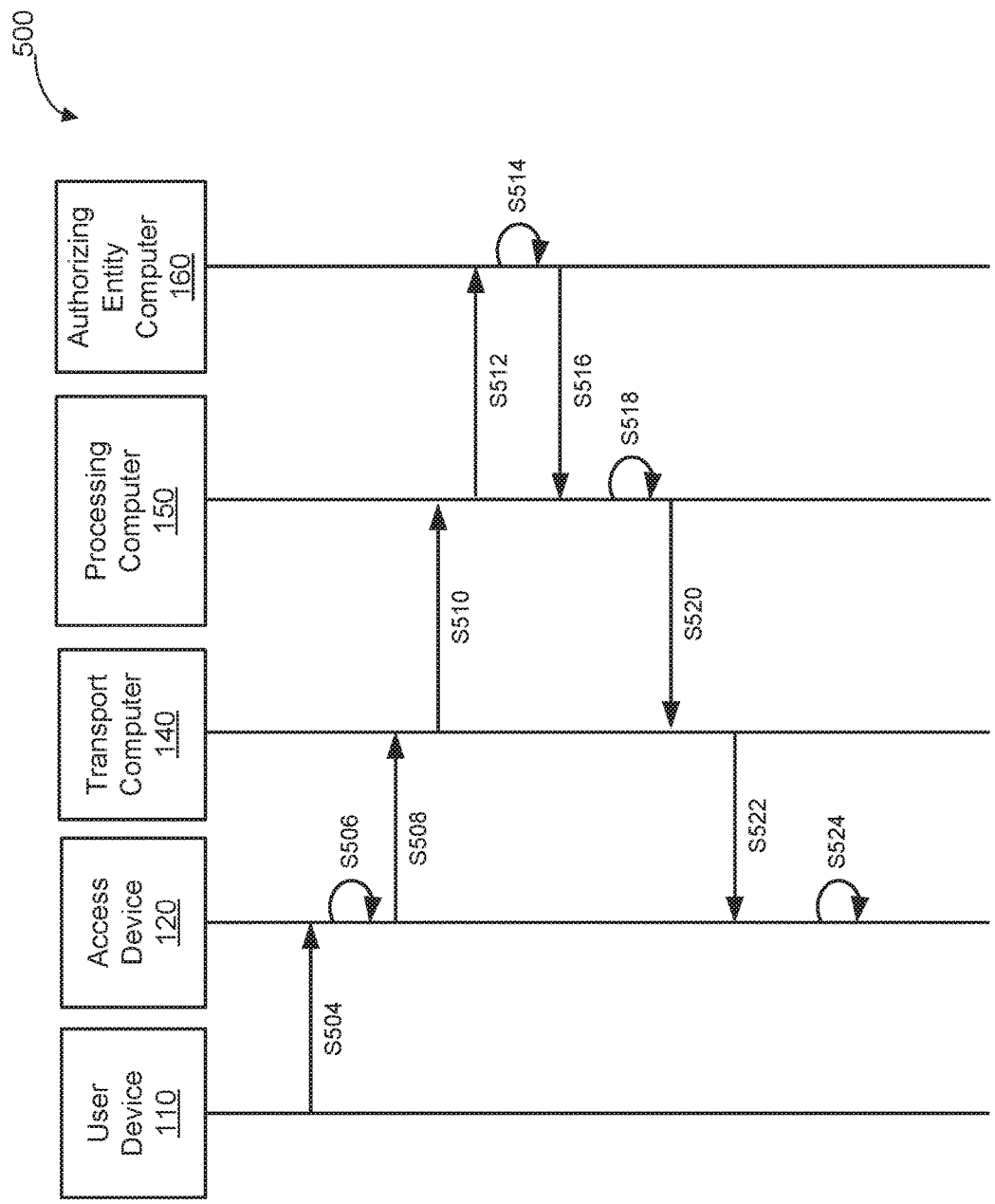
FIG. 5 illustrates a first exemplary flow for processing an authorization request message including an assertion type indicator for an interaction between a user and a resource provider according to various embodiments.

FIG. 5 illustrates a first exemplary flow 500 for processing an authorization request message including an assertion type indicator for an interaction between a user and a resource provider according to various embodiments. In the first exemplary flow 500, the processing computer 150 determines the assertion value corresponding to the assertion type indicator included in the authorization request message upon receiving the authorization response message from the authorizing entity computer 160.

At step S504, the user presents the user device 110 to the access device 120 associated with a resource provider to pass the access credential stored on the user device 110 to the access device 120. As described above, the access credential may be used to access a secure location (e.g. the physical secure location or the virtual secure location). In other embodiments, the access credential may be a payment credential associated with a payment account of the user issued by the authorizing entity.

At step S506, the access device 120 may receive the access credential and may generate an authorization request message to seek authorization for the interaction between the user and the resource provider. The access device 120 may also determine that the interaction is of a restricted type that needs verification of a user identity attribute. For example, the interaction may require the user to be above a predetermined age. Accordingly, the access device 120 may generate one or more assertion type indicators. The access device 120 may embed the access credential and the one or more assertion type indicators in the authorization request message. If the interaction is a payment transaction, the authorization request message may also include data elements including one or more of transaction amount, a merchant identifier, an access device identifier, and a digital signature of interaction data generated by the access device 120 and the user device 110.

At step S508, the access device 120 may transmit the authorization request message including the access credential and the one or more assertion type indicators to the transport computer 140.

At step S510, the transport computer 140 may transmit the authorization request message including the access credential and the one or more assertion type indicators to the processing computer 150.

At step S512, the processing computer 150 may transmit the authorization request message including the access credential and the one or more assertion type indicators to the authorizing entity computer 160. In some embodiments, the processing computer 150 may remove the one or more assertion type indicators from the authorization request message prior to transmitting the authorization request message to the authorizing entity computer 160.

At step S514, the authorizing entity computer 160 may process the authorization request message, determine whether the interaction between the user and the resource provider is authorized or declined, and generate an authorization response message including at least an indicator approving or declining the interaction. If the authorization request message included the one or more assertion type indicators, the authorizing entity computer 160 may incorporate the one or more assertion type indicators in the authorization response message.

At step S516, the authorizing entity computer 160 may transmit the authorization response message to the processing computer 150.

At step S518, the processing computer 150 may parse the authorization response message, identify the one or more assertion type indicators embedded in the authorization response message based on parsing, search a database storing access credentials as well as assertion values for assertion type indicators, and retrieve the one or more assertion values corresponding to the one or more assertion type indicators for the user from the database. The processing computer 150 may modify the authorization response message received from the authorizing entity computer 160 to incorporate the one or more assertion values corresponding to the one or more assertion type indicators.

At step S520, the processing computer 150 may transmit the authorization response message including the indicator approving or declining the interaction, and the one or more assertion values associated with the one or more assertion type indicators to the transport computer 140.

At step S522, the transport computer 140 may transmit the authorization response message including the indicator approving or declining the interaction, and the one or more assertion values associated with the one or more assertion type indicators to the access device 120.

At step S524, the access device 120 may receive the authorization response message, and display the indicator approving or declining the interaction and the one or more assertion values corresponding to the one or more assertion type indicators for the user. In some embodiments, the indicator approving or declining the interaction may indicate that the interaction is declined based at least upon a determination that the one or more assertion values represent failure to meet a predetermined threshold. In other embodiments, authorization of the interaction is independent of the one or more assertion values recited by the access device.

Assuming that the interaction is authorized and that the resource provider concludes that the user is able to obtain the desired resource, and if the interaction is a payment transaction, a clearing and settlement process may be conducted between the transport computer 140, the processing computer 150, and the authorizing entity computer 160 at a later time.

Figure 6:
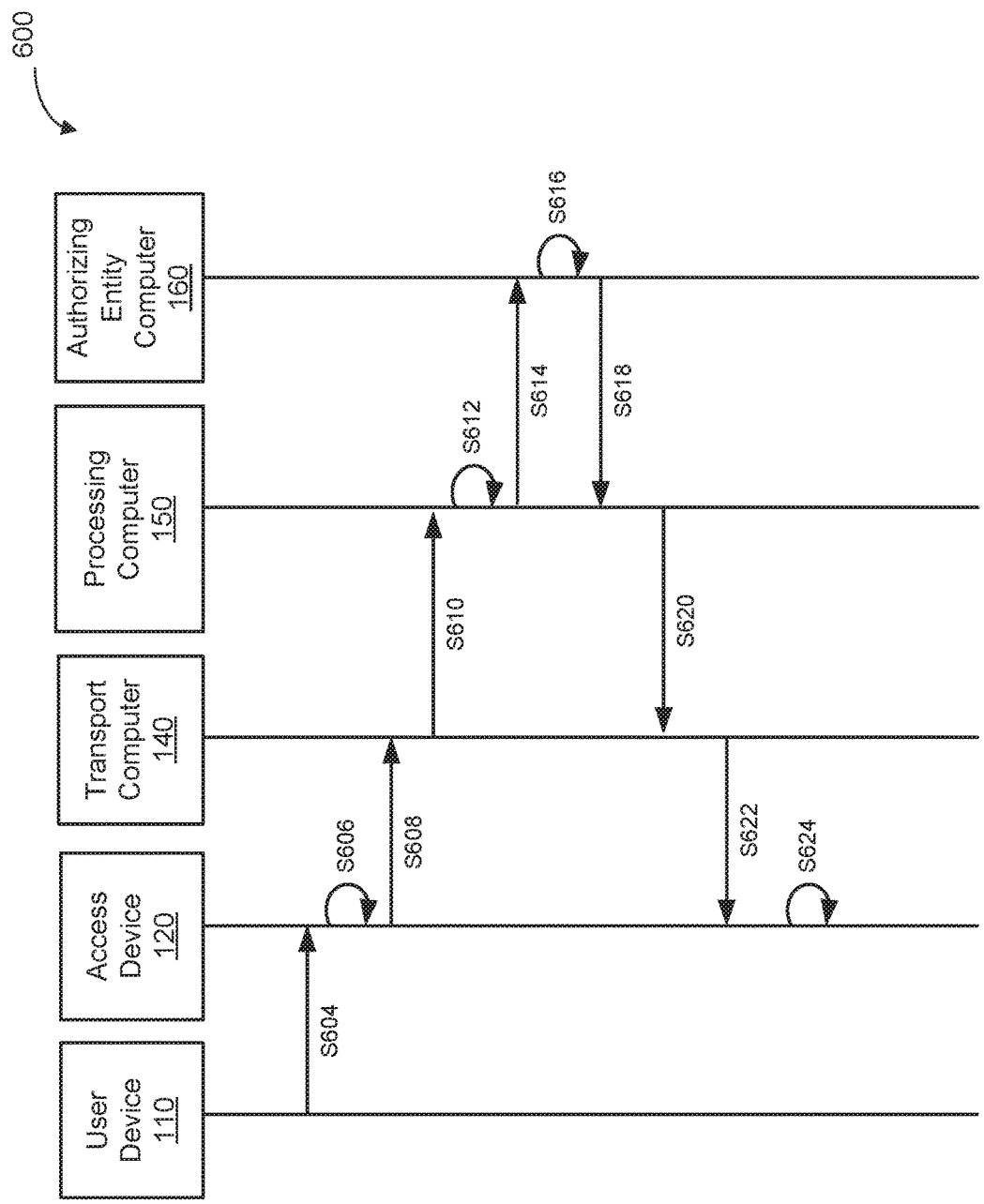
FIG. 6 illustrates a second exemplary flow for processing an authorization request message including an assertion type indicator for an interaction between a user and a resource provider according to various embodiments.

FIG. 6 illustrates a second exemplary flow 600 for processing an authorization request message including an assertion type indicator for an interaction between a user and a resource provider according to various embodiments. In the second exemplary flow 600, the processing computer 150 determines the assertion value corresponding to the assertion type indicator included in the authorization request message prior to forwarding the authorization request message to the authorizing entity computer 160.

At step S604, the user presents the user device 110 to the access device 120 associated with a resource provider to pass the access credential stored on the user device 110 to the access device 120.

At step S606, the access device 120 may receive the access credential and may generate an authorization request message to seek authorization for the interaction between the user and the resource provider. The access device 120 may generate one or more assertion type indicators and embed the one or more assertion type indicators in the authorization request message along with the access credential.

At step S608, the access device 120 may transmit the authorization request message including the access credential and the one or more assertion type indicators to the transport computer 140.

At step S610, the transport computer 140 may transmit the authorization request message including the access credential and the one or more assertion type indicators to the processing computer 150.

At step S612, the processing computer 150 may parse the authorization request message, identify the one or more assertion type indicators embedded in the authorization request message based on parsing, search a database storing access credentials as well as assertion values for assertion type indicators, and retrieve the one or more assertion values corresponding to the one or more assertion type indicators for the user in the database. The processing computer 150 may modify the authorization request message transmitted by the access device 120 via the transport computer 140 to incorporate the one or more assertion values corresponding to the one or more assertion type indicators.

At step S614, the processing computer 150 may transmit the authorization request message including the access credential and the one or more assertion values corresponding to the one or more assertion type indicators to the authorizing entity computer 160.

At step S616, the authorizing entity computer 160 may process the authorization request message, determine whether the interaction between the user and the resource provider is authorized or declined, and generate an authorization response message including at least an indicator approving or declining the interaction, and the one or more assertion values corresponding to the one or more assertion type indicators.

At step S618, the authorizing entity computer 160 may transmit the authorization response message to the processing computer 150.

At step S620, the processing computer 150 may transmit the authorization response message including the indicator approving or declining the interaction, and the one or more assertion values associated with the one or more assertion type indicators to the transport computer 140.

At step S622, the transport computer 140 may transmit the authorization response message including the indicator approving or declining the interaction, and the one or more assertion values associated with the one or more assertion type indicators to the access device 120.

At step S624, the access device 120 may receive the authorization response message, and display the indicator approving or declining the interaction and the one or more assertion values corresponding to the one or more assertion type indicators for the user.

Assuming that the interaction is authorized and that the resource provider concludes that the user is able to obtain the desired resource, and if the interaction is a payment transaction, a clearing and settlement process may be conducted between the transport computer 140, the processing computer 150, and the authorizing entity computer 160 at a later time.

Figure 7:
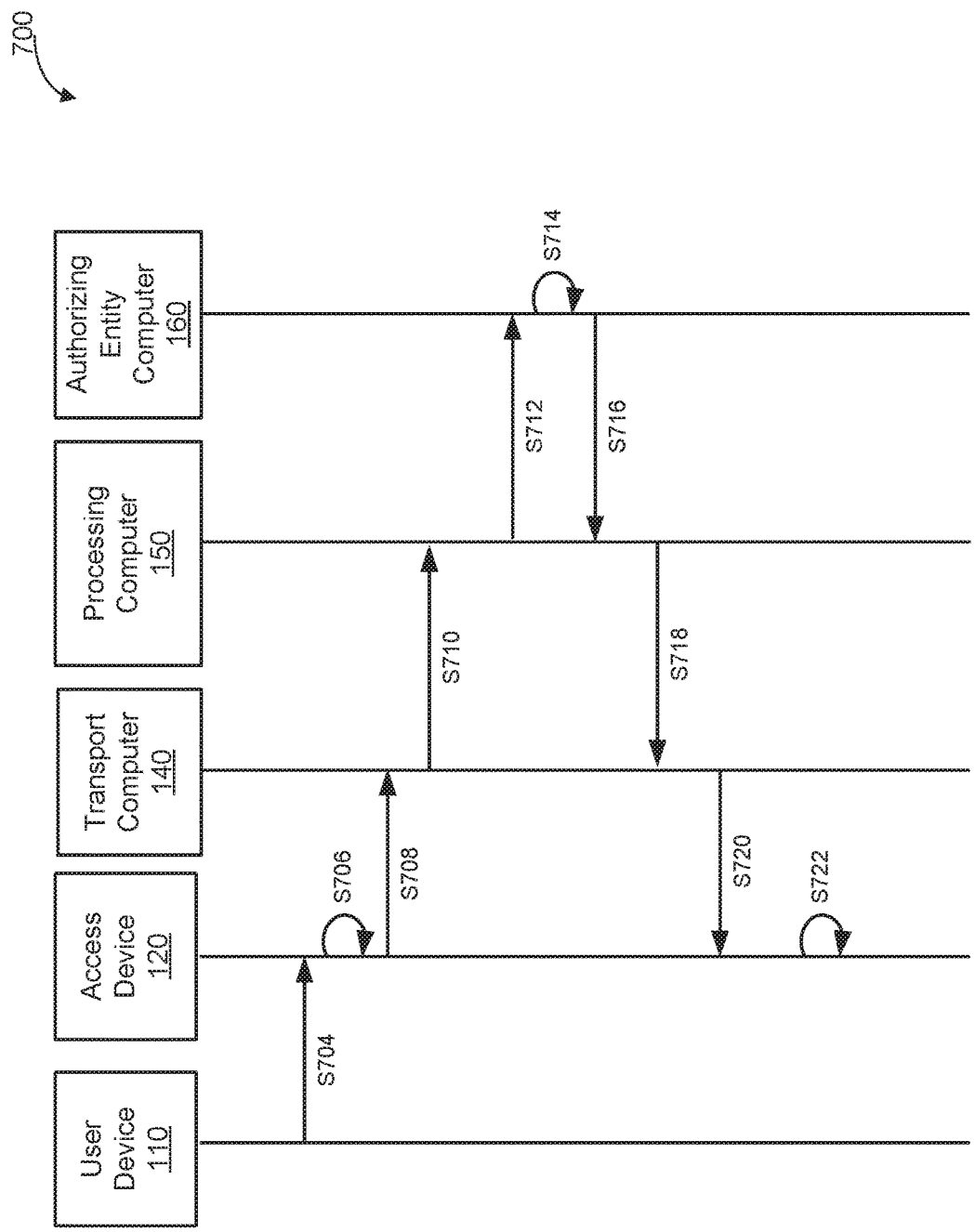
FIG. 7 illustrates a third exemplary flow for processing an authorization request message including an assertion type indicator for an interaction between a user and a resource provider according to various embodiments.

FIG. 7 illustrates a third exemplary flow 700 for processing an authorization request message including an assertion type indicator for an interaction between a user and a resource provider according to various embodiments. In the third exemplary flow 700, the authorizing entity computer 160 determines the assertion value corresponding to the assertion type indicator included in the authorization request message.

At step S704, the user presents the user device 110 to the access device 120 associated with a resource provider to pass the access credential stored on the user device 110 to the access device 120.

At step S706, the access device 120 may receive the access credentials and may generate an authorization request message to seek authorization for the interaction between the user and the resource provider. The access device 120 may generate one or more assertion type indicators and embed the one or more assertion type indicators in the authorization request message along with the access credential.

At step S708, the access device 120 may transmit the authorization request message including the access credential and the one or more assertion type indicators to the transport computer 140.

At step S710, the transport computer 140 may transmit the authorization request message including the access credential and the one or more assertion type indicators to the processing computer 150.

At step S712, the processing computer 150 may transmit the authorization request message including the access credential and the one or more assertion type indicators to the authorizing entity computer 160.

At step S714, the authorizing entity computer 160 may process the authorization request message, determine whether the interaction between the user and the resource provider is authorized or declined. The authorizing entity computer 160 may also parse the authorization request message, identify the one or more assertion type indicators embedded in the authorization request message based on parsing, search a database storing access credentials as well as assertion values for assertion type indicators, and retrieve the one or more assertion values corresponding to the one or more assertion type indicators for the user in the database. The authorizing entity computer 160 may generate an authorization response message including at least an indicator approving or declining the interaction and the one or more assertion values corresponding to the one or more assertion type indicators.

At step S716, the authorizing entity computer 160 may transmit the authorization response message to the processing computer 150.

At step S718, the processing computer 150 may transmit the authorization response message including the access credential and the one or more assertion values corresponding to the one or more assertion type indicators to the transport computer 140.

At step S720, the transport computer 140 may transmit the authorization response message including the indicator approving or declining the interaction, and the one or more assertion values associated with the one or more assertion type indicators to the access device 120.

At step S722, the access device 120 may receive the authorization response message, and display the indicator approving or declining the interaction and the one or more assertion values corresponding to the one or more assertion type indicators for the user.

Assuming that the interaction is authorized and that the resource provider concludes that the user is able to obtain the desired resource, and if the interaction is a payment transaction, a clearing and settlement process may be conducted between the transport computer 140, the processing computer 150, and the authorizing entity computer 160 at a later time.

Figure 8:
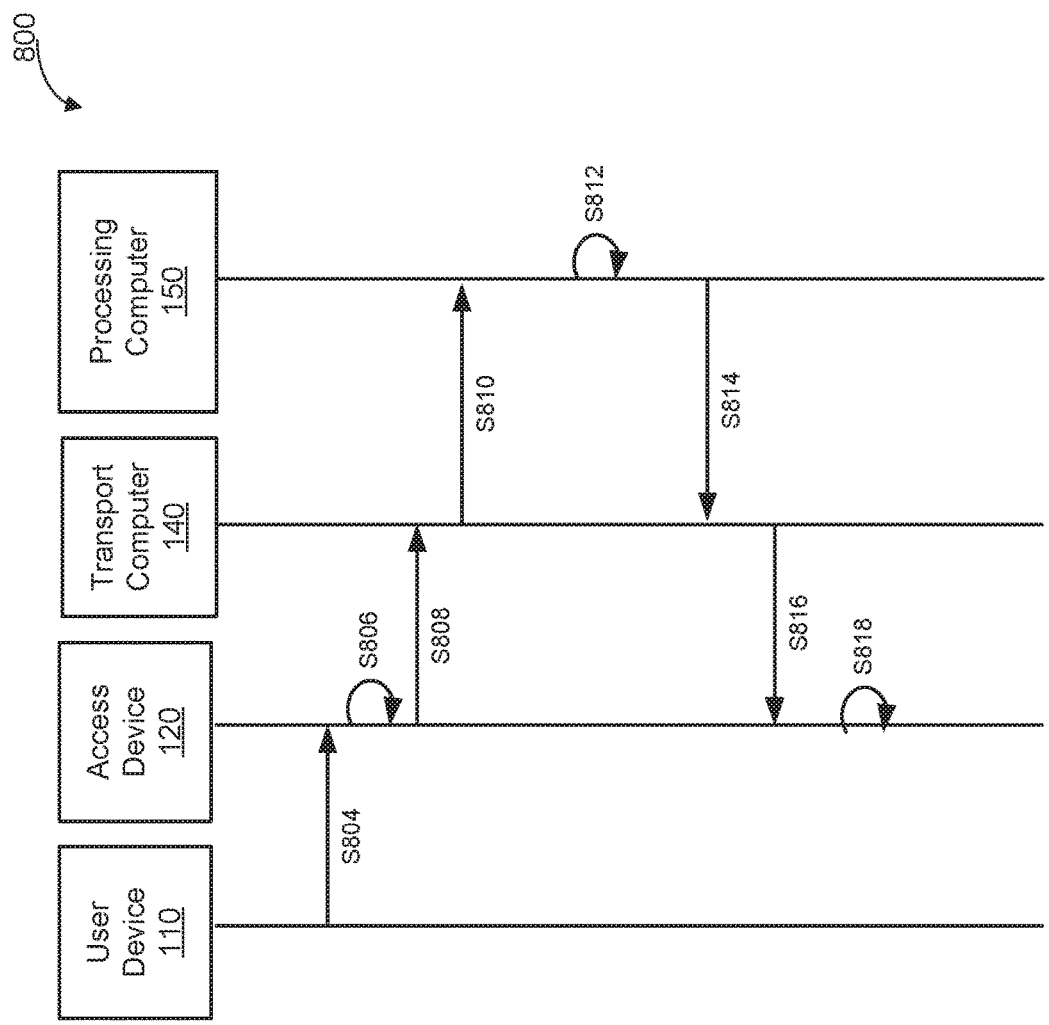
FIG. 8 illustrates a fourth exemplary flow for processing an authorization request message including an assertion type indicator for an interaction between a user and a resource provider according to various embodiments.

FIG. 8 illustrates a fourth exemplary flow 800 for processing an authorization request message including an assertion type indicator for an interaction between a user and a resource provider according to various embodiments. In the fourth exemplary flow 800, the processing computer 150 performs stand-in processing in lieu of the authorizing entity computer 160. The processing computer 150 determines whether the interaction is to be authorized or declined, as well the assertion value corresponding to the assertion type indicator included in the authorization request message.

At step S804, the user presents the user device 110 to the access device 120 associated with a resource provider to pass the access credential stored on the user device 110 to the access device 120.

At step S806, the access device 120 may receive the access credential and may generate an authorization request message to seek authorization for the interaction between the user and the resource provider. The access device 120 may generate one or more assertion type indicators and embed the one or more assertion type indicators in the authorization request message along with the access credential.

At step S808, the access device 120 may transmit the authorization request message including the access credential and the one or more assertion type indicators to the transport computer 140.

At step S810, the transport computer 140 may transmit the authorization request message including the access credential and the one or more assertion type indicators to the processing computer 150.

At step S812, the processing computer 150 may perform stand-in processing for the authorizing entity computer. The processing computer 150 may process the authorization request message, determine whether the interaction between the user and the resource provider is authorized or declined. The processing computer 150 may also parse the authorization request message, identify the one or more assertion type indicators embedded in the authorization request message based on parsing, search a database storing assertion values for assertion type indicators, and access credentials, and retrieve the one or more assertion values corresponding to the one or more assertion type indicators for the user in the database. The processing computer 150 may generate an authorization response message including at least an indicator approving or declining the interaction and the one or more assertion values corresponding to the one or more assertion type indicators.

At step S814, the processing computer 150 may transmit the authorization response message including the access credential and the one or more assertion values corresponding to the one or more assertion type indicators to the transport computer 140.

At step S816, the transport computer 140 may transmit the authorization response message including the indicator approving or declining the interaction, and the one or more assertion values associated with the one or more assertion type indicators to the access device 120.

At step S818, the access device 120 may receive the authorization response message, and display the indicator approving or declining the interaction and the one or more assertion values corresponding to the one or more assertion type indicators for the user. In some embodiments, the indicator approving or declining the interaction may indicate that the interaction is declined based at least upon a determination that the one or more assertion values represent failure to meet a predetermined threshold.

In the embodiments described in FIGS. 5-8, either the processing computer or the authorizing entity computer receives an assertion type indicator and then retrieves one or more assertion values and includes them in an authorization request message or an authorization response message. In some embodiment, the processing computer, the authorizing entity computer, and/or any other computer (e.g., the transport computer) may review assertion type indicators in an authorization request or response message and may insert one or more assertion values in the either or both of the messages.

Embodiments of the invention have a number of advantages. For example, embodiments of the invention check user attributes for restricted interactions (e.g. interactions subject to legal or security restrictions) based on secure user data. Instead of requiring the user to provide information about an identity attribute, embodiments may acquire the required information from previously provided user data. In addition, embodiments provide an additional security layer by eliminating the need to check the user's identification. Embodiments provide information about the user's identity attribute without disclosing the actual identity attribute. For example, for a purchase of goods or services subject to age restriction, embodiments request and obtain an affirmative or negative answer to the question of whether the user is above the predetermined age limit.

In addition, embodiments eliminate unauthorized interactions that may otherwise be allowed due to the resource provider clerk's omission of checking the required restriction (e.g. when the clerk fails to check identification for purchase of goods of services subject to age restriction). By incorporating an assertion type indicator (e.g. a question about the user's identity attribute) in the authorization request message, embodiments automatically check the identity attribute required for the restricted interaction.

In addition, embodiments of the invention advantageously combine an information retrieval process in a transaction authorization process, while keeping sensitive data associated with the retrieved information secret and protected. Thus, embodiments of the invention not only provide data security, but provide for improved processing efficiency since only one message set is needed to obtain assertion data and to perform a transaction. Other processes would require multiple communications to achieve a similar result (e.g., two communications to request and retrieve information, and two communications to obtain authorization, as compared to embodiments of the invention where two communications would be used to both request and retrieve information and also to obtain authorization).

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server computer comprising:
a processor; and
a non-transitory computer readable medium coupled to the processor, the non-transitory computer readable medium comprising code that when executed by the processor, causes the processor to:

receive, from an access device, an authorization request message for an interaction between a user and a resource provider, the authorization request message comprising an access credential and an inquiry about a secure fact associated with the user, wherein the inquiry is provided in form of one or more assertion type indicators that are automatically inserted in the authorization request message based on an identifier of a good or a service provided by the resource provider, wherein the secure fact includes an identity attribute of the user;

identify the one or more assertion type indicators embedded in the authorization request message based on parsing;

retrieve one or more assertion values corresponding to the one or more assertion type indicators for the user from a database;

obtain an answer to the inquiry about the secure fact associated with the user;

embed the answer to the inquiry in the authorization request message in form of the one or more assertion values associated with the one or more assertion type indicators thereby generating a modified authorization request message;

transmit the modified authorization request message to an authorizing entity computer;

receive, from the authorizing entity computer, an authorization response message comprising an indicator approving or declining the interaction; and transmit, to the access device, the authorization response message comprising the indicator approving or declining the interaction, and the one or more assertion values associated with the one or more assertion type indicators to the access device.

2. The server computer of claim 1, wherein the access credential is a credential that is used to access a secure location.

3. The server computer of claim 1, wherein the indicator approving or declining the interaction indicates that the interaction is declined, wherein the decline is based at least upon a determination that the one or more assertion values represent failure to meet a predetermined threshold.

4. The server computer of claim 1, wherein at least one of the one or more assertion type indicators inquire about whether the user is above a predetermined age.

5. The server computer of claim 1, wherein the one or more assertion type indicators include a closed question that can be answered either in affirmative or negative.

6. The server computer of claim 1, wherein a data field of the authorization request message that stores the one or more assertion type indicators is customized based on the resource provider.

7. A method comprising:
receiving, by a server computer from an access device, an authorization request message for an interaction between a user and a resource provider, the authorization request message comprising an access credential and an inquiry about a secure fact associated with the user, wherein the inquiry is provided in form of one or more assertion type indicators that are automatically inserted in the authorization request message based on an identifier of a good or a service provided by the resource provider, wherein the secure fact includes an identity attribute of the user;

identifying, by the server computer, the one or more assertion type indicators embedded in the authorization request message based on parsing;

retrieving, by the server computer, one or more assertion values corresponding to the one or more assertion type indicators for the user from a database;

obtaining, by the server computer, an answer to the inquiry about the secure fact associated with the user;

embedding, by the server computer, the answer to the inquiry in the authorization request message in form of the one or more assertion values associated with the one or more assertion type indicators thereby generating a modified authorization request message;

transmitting, by the server computer, the modified authorization request message to an authorizing entity computer;

receiving, by the server computer from the authorizing entity computer, an authorization response message comprising an indicator approving or declining the interaction; and transmitting, by the server computer to the access device, the authorization response message comprising the indicator approving or declining the interaction, and the one or more assertion values associated with the one or more assertion type indicators to the access device.

8. The method of claim 7, wherein the indicator approving or declining the interaction indicates that the interaction is declined, wherein the decline is based at least upon a determination that the one or more assertion values represent failure to meet a predetermined threshold.

9. The method of claim 7, wherein at least one of the one or more assertion type indicators inquire about whether the user is above a predetermined age.

10. The method of claim 7, wherein the one or more assertion type indicators include a closed question that can be answered either in affirmative or negative.

11. The method of claim 7, wherein a data field of the authorization request message that stores the one or more assertion type indicators is customized based on the resource provider.

12. A method comprising:
receiving, by an authorizing entity computer from a server computer, an authorization request message for an interaction between a user and a resource provider, the authorization request message comprising an access credential and an inquiry about a secure fact associated with the user, wherein the inquiry is provided in form of one or more assertion type indicators that are automatically inserted in the authorization request message based on an identifier of a good or a service provided by the resource provider, wherein the secure fact includes an identity attribute of the user;

identifying, by the authorizing entity computer, the one or more assertion type indicators embedded in the authorization request message based on parsing;

retrieving, by the authorizing entity computer, one or more assertion values corresponding to the one or more assertion type indicators for the user from a database;

obtaining, by the authorizing entity computer, an answer to the inquiry about the secure fact associated with the user;

generating, by the authorizing entity computer, an authorization response message comprising an indicator approving or declining the interaction;

embedding, by the authorizing entity computer, the answer to the inquiry in the authorization response message in form of the one or more assertion values associated with the one or more assertion type indicators; and transmitting, by the authorizing entity computer, the authorization response message to the server computer for relaying to an access device.

13. The method of claim 12, wherein the indicator approving or declining the interaction indicates that the interaction is declined, wherein the decline is based at least upon a determination that the one or more assertion values represent failure to meet a predetermined threshold.

14. The method of claim 12, wherein at least one of the one or more assertion type indicators inquire about whether the user is above a predetermined age.

15. The method of claim 12, wherein the one or more assertion type indicators include a closed question that can be answered either in affirmative or negative.

* * * * *